Aug. 17, 1937. L. J. MONTGOMERY ET AL 2,090,302
MAGNETIC DUMMY FUSE PLUG
Filed May 4, 1934 3 Sheets-Sheet 1
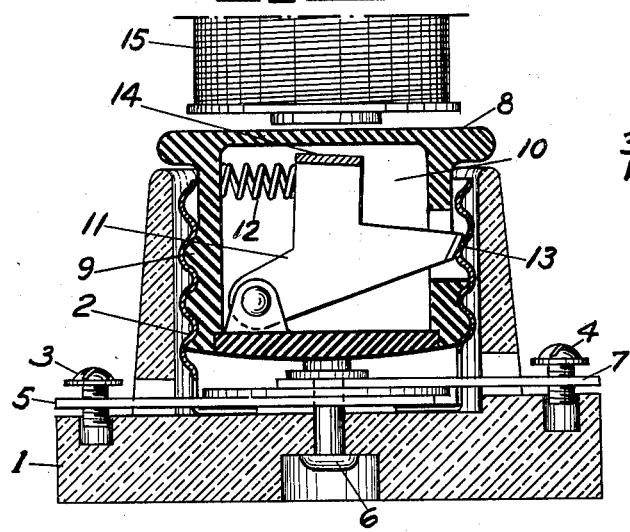
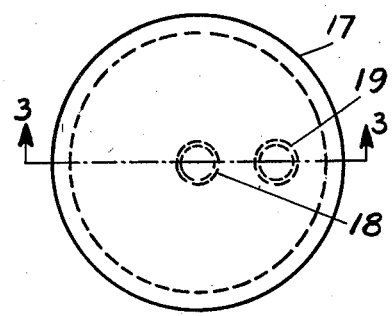
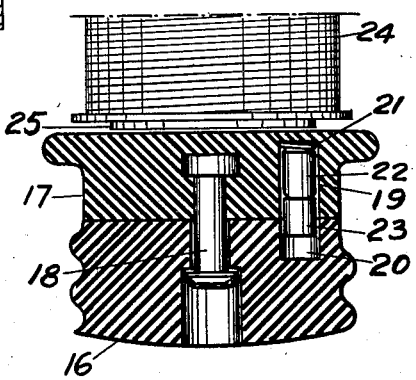
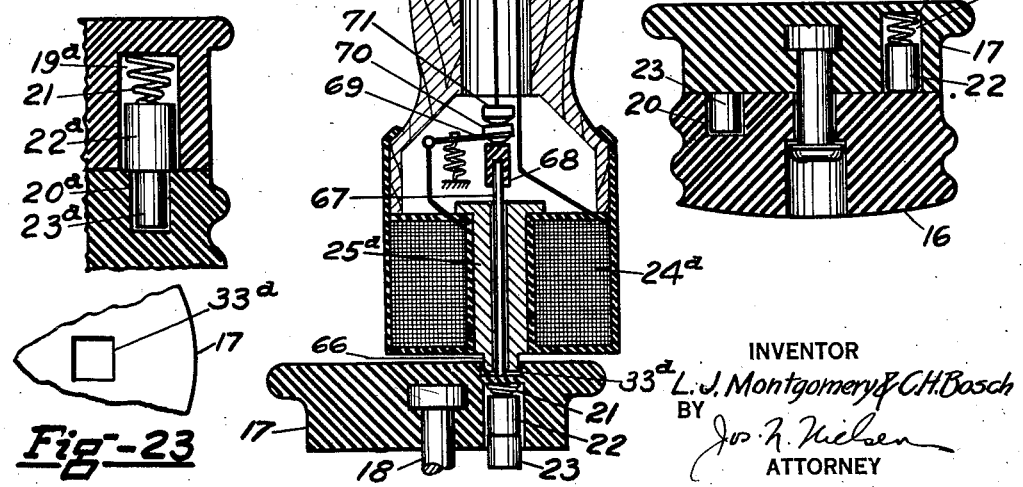
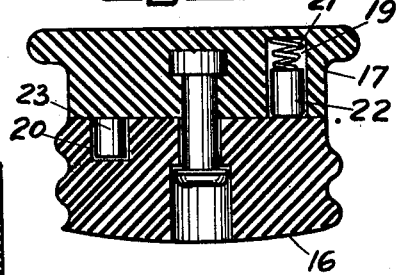
INVENTOR
L. J. Montgomery & C. H. Bosch
BY
Jos. R. Nielsen
ATTORNEY

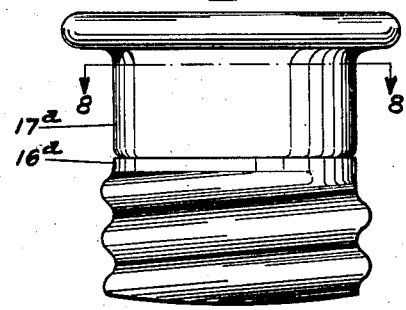
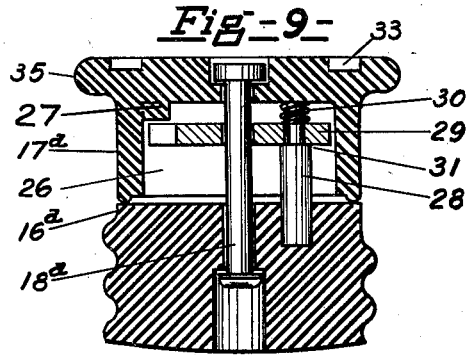
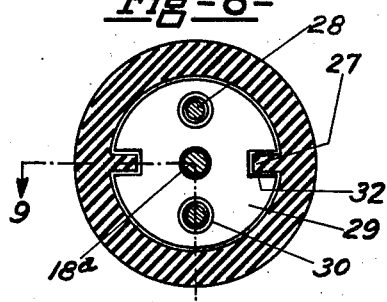
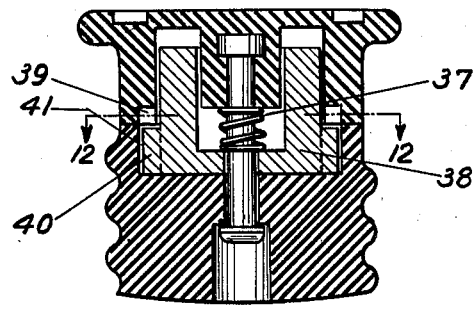
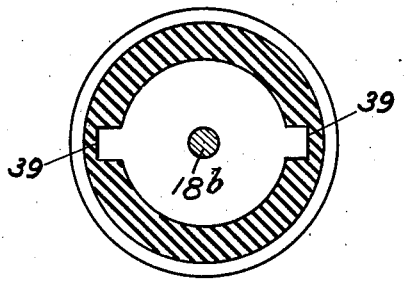
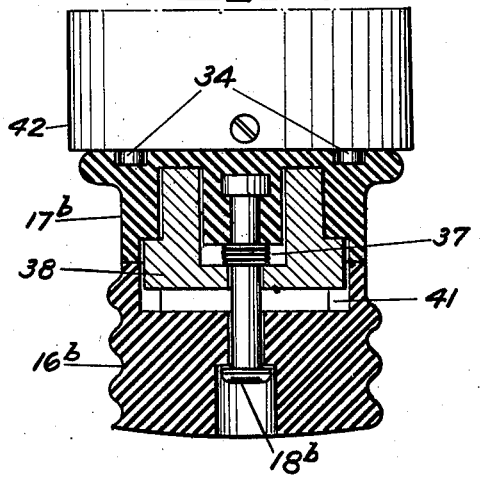
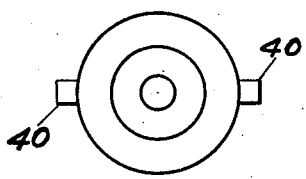
INVENTOR
L. J. Montgomery & C. H. Bosch
BY
ATTORNEY Aug. 17, 1937.   L. J. MONTGOMERY ET AL   2,090,302
MAGNETIC DUMMY FUSE PLUG
Filed May 4, 1934   3 Sheets-Sheet 3
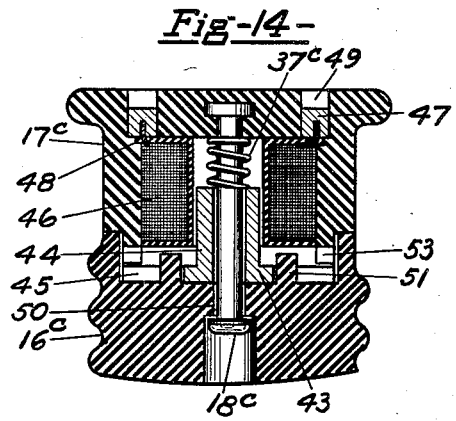
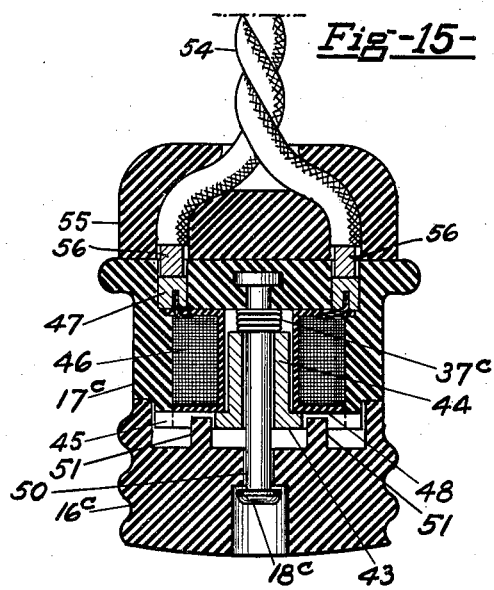
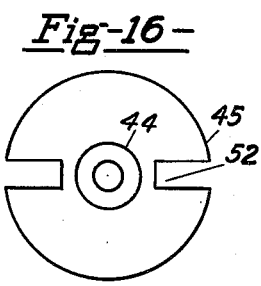
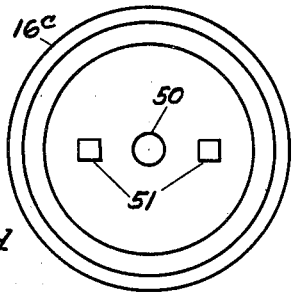
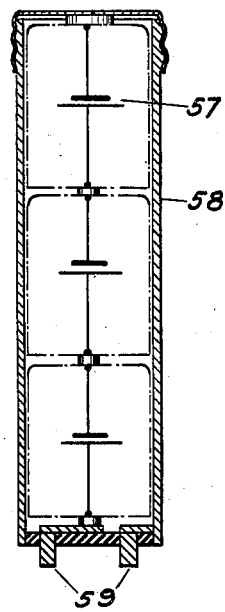
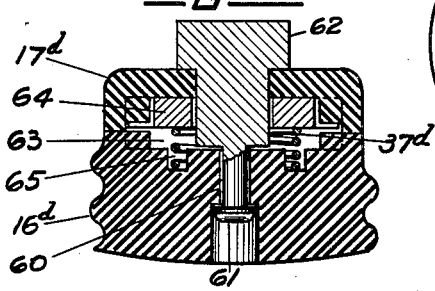
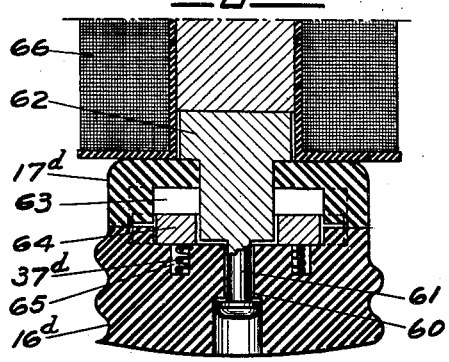
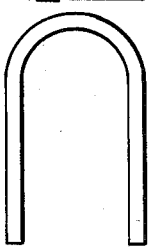
INVENTOR
L. J. Montgomery & C. H. Bosch
BY
ATTORNEY Patented Aug. 17, 1937

2,090,302

UNITED STATES PATENT OFFICE 2,090,302

MAGNETIC DUMMY FUSE PLUG

Lawrence J. Montgomery, Douglaston, and Charles H. Bosch, Brooklyn, N. Y.

Application May 4, 1934, Serial No. 723,892

14 Claims. (Cl. 173—356)

This invention relates to dummy fuse plugs intended to be installed in place of screw plug fuses in common use for connecting the mains of electrical supply companies to the house lines of individual consumers. The dummy plugs are substituted when the supply of electricity is to be discontinued for non-payment of bills or other reasons. They differ from fuse plugs in that they do not complete the circuit through the socket and are designed to be non-removable except by those persons equipped with suitable tools or devices.

According to the present invention a dummy fuse plug is provided which depends for its manipulation on magnetic means. To this end it incorporates within a body of insulating material an armature or other magnetic-responsive means, and it requires the actuation of such means before the plug can be manipulated for insertion or removal; the body can be formed from porcelain, molded phenolic resin composition or other suitable insulating material. The armature or other magnetic-responsive means is concealed within the plug body to render it inaccessible and to require the application of a magnetic means for its operation; such magnetic means can be applied externally of the plug to operate the responsive means, or the magnetic means can be incorporated in the plug structure. The responsive means can take various forms such as a movable pin, a bar, or a plate and it can be either of the attraction or repulsion type. Preferably a positively acting biasing means such as a spring is included to oppose the action of the magnetic means for insuring proper positioning of the magnetic-responsive means within the plug and for maintaining the responsive means in that position when not acted upon by a magnetic means.

In order that the invention may be clearly understood and its scope made evident, several specific embodiments are illustrated in the accompanying drawings and hereinafter described. The invention, however, is not limited to these specific embodiments but is to be given an interpretation commensurate with the appended claims.

Referring to the drawings—

Fig. 1 is a vertical cross section of an assembly of a fuse socket and a one piece dummy plug constituting one embodiment of the invention; the figure also illustrates a fragmentary portion of an electromagnet placed in position relative to the plug but not energized.

Fig. 2 is a top view of a two-part plug illustrating a second embodiment of the invention; Fig. 3 is a vertical cross section of line 3—3 of Fig. 2; Fig. 4 is a cross section similar to Fig. 3 but illustrating in addition a fragmentary portion of an electro-magnet and the magnetic-responsive means in the position occupied when the magnet is energized; Fig. 5 is a cross section similar to Fig. 3 but with the the cover part of the plug rotated at 180 degrees with reference to the base part; and Fig. 6 is a fragmentary vertical cross section similar to Fig. 3 but illustrating a modified form of magnetic-responsive means.

Fig. 7 is a side elevation of a two-part plug illustrating a third embodiment of the invention; Fig. 8 is a horizontal cross section on the line 8—8 of Fig. 7; and Fig. 9 is a vertical cross section on the line 9—9 of Fig. 8.

Fig. 10 is a vertical cross section of a fourth embodiment of the invention as applied to a two-part plug; Fig. 11 is a view similar to Fig. 10 but including a fragmentary portion of a magnetic means applied to the plug and illustrating the magnetic-responsive means in the position occupied when the magnet is energized; Fig. 12 is a horizontal cross section on the line 12—12 of Fig. 10 but with the magnetic-responsive means omitted; and Fig. 13 is a top plan view of the magnetic-responsive means included in the embodiment shown in Fig. 10.

Fig. 14 is a vertical cross section of a fifth embodiment of the invention illustrating in vertical cross section a two-part plug having incorporated therein a magnetic means in addition to a magnetic-responsive means; Fig. 15 is a view similar to Fig. 14 but illustrating in addition the application of energizing means for the magnet and the armature in a raised position which it occupies when the magnet is energized; Fig. 16 is a top plan view of the armature incorporated in the embodiment of Fig. 14; and Fig. 17 is a top plan view of the base part of the plug illustrated in Fig. 14.

Fig. 18 is a cross section of a casing illustrating enclosed batteries in diagrammatic form and having terminals for energizing an electromagnet.

Fig. 19 illustrates in vertical cross section a sixth embodiment of the invention as applied to a two-part plug and embodying a repulsion type of magnetic-responsive means; and Fig. 20 is a view similar to Fig. 19 but illustrating in addition a fragmentary portion of a magnetic means and showing the responsive means in repelled position.

Fig. 21 is an elevation of a permanent magnet which can be used with the various embodiments illustrated; Fig. 22 is a vertical cross section of an electromagnet and shown in conjunction with the cover part portion of the embodiment illustrated in Fig. 3; and Fig. 23 is a fragmentary top view of the cover part illustrated in Fig. 22.

Referring to the assembly shown in Fig. 1 a cut-out base 1 supports a fuse socket 2 that is connected to a terminal 3 by the fitting 5 and to a terminal 4 by the fittings 6 and 7. The dummy fuse plug shown as mounted in the socket 2 consists of a one-piece body 8 having screw threads 9 formed thereon for engagement with the socket. The body 8 has an internal cavity 10 in which is hingedly mounted a lever arm 11 biased to one side by a spring 12. The arm carries a sharpened end 13 for cutting into the thin shell of the fuse socket; the end 13 is driven into the shell by the spring 12 and prevents unscrewing of the plug from the socket. The arm carries an armature 14 so formed and located as to be attracted by an electro-magnet 15 when the magnet is brought into external contact with the plug and is energized by an electric current. Attraction of the armature by the magnet withdraws the sharpened end 13 from the shell 2, thereby leaving the plug free for unscrewing from the socket. In installing the plug the electro-magnet is applied and energized so as to keep the end 13 from contact with the shell; after the plug is screwed in place into the socket the electro-magnet is removed and the spring 12 thereupon presses the end 13 into the shell.

In the embodiment illustrated by Figs. 2 to 5 inclusive a two-part plug is illustrated consisting of the base 16 and the cover 17. The base 16 is screw threaded to engage a fuse socket and the cover 17 is swivelled on the base by means of a rivet 18 molded into the cover and free to turn in the base 16. The cover 17 has a cavity 19 which registers at one position with a similar cavity 20 in the base; these cavities as shown are cylindrical and have their axes parallel to one side of the rivet 18. When the plug parts are assembled these cavities are inaccessible from the exterior of the plug. Within the cover cavity 19 there is a spring 21 adjacent its closed end and a cylindrical pellet 22 pressed by the spring; the pellet is shorter than the cavity and is loose therein. The base cavity 20 is substantially filled by a cylindrical pellet 23 fitting loosely in the cavity so that it can slide freely therein.

When the cavities 19 and 20 are in register as shown in Fig. 5 the pellet 22 is pressed against the pellet 23 by the spring 21, but since the pellet 23 fills the cavity 20 the pellet 22 does not extend below the contact surface of the base and cover parts. The cover can therefore be freely rotated upon the base and into a position such as shown in Fig. 5. When the cavities are again brought into register and an electro-magnet applied (shown in Fig. 4 as made up of a core 25 and a winding 24) and the magnet is energized, the pellets are pulled up against the action of the spring 21 by the magnet thus drawing the pellet 23 into the cavity 20. The base and cover are then locked against relative movement by the pellet 23 extending into both cavities so that the plug may be screwed into a fuse socket or removed from a fuse socket by turning the cover. Upon deenergizing the magnet or removing the magnet from the plug the spring 21 depresses the pellet 23 into its cavity 20 through the pellet 22, thereby unlocking the cover from the base so that the base can again be freely rotated.

To insure freedom of rotation when there is no magnetic action applied modified forms of pellets as shown in Figure 6 can be substituted. According to the disclosure of this figure a reduced cavity 20ᵃ is provided in which fits a pellet 23ᵃ. The pellet 22 carried in the cavity 19 is accordingly too large to enter the cavity 20ᵃ and therefore rides upon the surface of the base when the cover is rotated.

In the embodiment of Figs. 7, 8, and 9 a plate armature is disclosed. A two-part plug consists of the cover 17ᵃ and base 16ᵃ swivelled together by a rivet 18ᵃ. The cover is made with a cavity 26 that is cylindrical in shape with the exception of two cast-in projections 27. The base 16ᵃ carries two cylindrical pins 28 which extend into the cavity 26. An armature plate 29 rests on shoulders 31 formed on the pins 28, and springs 30 on the pins force the plate against the shoulders 31; notches 32 are formed in the plate to register with the projections 27.

When an energized electro-magnet is applied to the cover 17ᵃ, it attracts the armature plate 29 against the bias of the springs 30. If the cover 17ᵃ is then rotated with relation to the base until the notches 32 register with the projections 27, the plate is lifted by the magnet against the action of the springs to cause the projections to enter the notches. Since the pins 28 prevent rotation of the plate 29 with respect to the base 16ᵃ and the projections 27 form a part of the cover 17ᵃ, the base and cover are thereby locked against the relative rotation; the plug can thereupon be screwed into or out of a fuse socket by turning the cover 17ᵃ. Upon removal of the magnet the springs 30 press the plate 29 against the shoulders 31 thereby releasing the projections 27 so that the cover is free to rotate on the base.

To assist in rotating the plug when the base and cover are locked together through the energizing action of a magnet, cavities 33 can be provided in the cover to cooperate with pins 34 extending from a magnet. Such a construction of the magnet is shown in Fig. 11. By this means rotation of the magnet causes rotation of the cover and therefore of the base through locking engagement of the armature plate 29.

In the embodiment of the plug shown in Figs. 10 to 13 the plate of Fig. 9 is substituted by a movable armature cup 38. To accommodate the cup the cover 17ᵇ is provided with a similarly shaped cavity, and the base 16ᵇ is provided with a cavity into which the cup can be depressed. The cup is slidably mounted on the rivet 18ᵇ securing the cover 17ᵇ to the base 16ᵇ, and a spring 37 carried by the rivet serves to bias or force the cup into the base cavity. In order to obtain a locking engagement by means of the cup, lugs 40 are formed on the cup 38; these lugs ride in notches 41 provided in the base 16ᵇ and also engage notches 39 formed in the cover 17ᵇ when the cup 38 is raised so as to lift the lugs above the surface of the base and when the notches 39 and 41 are in register. The cup is raised by applying a magnet as shown in Fig. 11 to the cover and energizing the magnet; upon removal of the magnet the spring depresses the cup so as to release the lugs 40 from engagement with the notches 39 and thereby promote free rotation of the cover on the base.

In the embodiment of Figs. 14 to 17 inclusive an electro-magnet is incorporated as part of a two-part plug consisting of the base 16ᶜ and cover 17ᶜ held together by the rivet 18ᶜ. Within a cavity in the base there is provided an armature 43 consisting of a tubular extension 44 and a flange 45; the tubular portion slides on the rivet 18c and is biased into a depressed position by a spring 37c carried by the rivet. An electro-magnet 46 consisting of a coil of insulated wire wound on an insulating form 48 is secured in a cavity in the cover 17c; its ends are brought out into holes 49 extending to the exterior of the cover and provided with terminals 47. The extension 44 of the armature rides within the electro-magnet 46. The flange portion 45 of the armature 43 is formed with notches 52 to engage projections 51 extending from the base and thereby prevent turning of the armature with respect to the base. There are also projections 53 formed on the cover to be engaged by the notches 52 when brought into register. When the electro-magnet is to be energized a cap 55 carrying terminals 56 of a supply line 54 is placed in position so that the terminals contact the coil terminals 47. When the current is turned on the electromagnet is thereby energized to lift the armature 43, and when the projections 53 are in register with the notches 52 of the armature the cover becomes locked to the base; upon cutting off the current the spring 37c depressess the armature and releases the cover.

In Fig. 18 there is disclosed three dry batteries 57 within a casing 58 having terminals 59 to engage the terminals 47. This means of providing the electro-magnet 46 with current can be substituted for the cap 55 when the magnet 46 is designed for operation on low voltage direct current.

When magnetism set up by an alternating current coil links with a closed conducting circuit, a current is caused to flow in that circuit by electromagnetic induction; the conducting circuit is thereupon repelled mechanically by the reaction of the magnetic forces between the coil and the closed circuit. This principle is applied in the embodiment shown in Figs. 19 and 20 in which a base 16d is swivelly secured to a cover 17d by a rivet 61; the rivet 61 has formed with it a core of magnetic material 62 which may be in one piece or more as desired. The core 62 which is fixed to the cover 17d extends into a cavity 63 in the base 16d. A ring 64 of conducting metal preferably copper, slides freely on the core 62 and is biased into the cavity formed in the cover 17d by a spring 37d; the latter is seated in an annular recess 65 in the base. The conducting ring 64 is notched at diametrically opposite points to cooperate with projections formed in the base and also in the cover as explained in the description of the previous embodiment. When an energized coil 66 is placed about the core 62 as illustrated in Fig. 20, the current set up in the conducting ring 64 results in its magnetic repulsion by the coil 66 away from the cover 17d and toward the base 16d to lock the cover and base together; upon removal of the current the spring 37d returns the ring to unlock the base and cover.

As an external magnetic means for causing operation of the magnetic-responsive means, a permanent magnet can be used as illustrated in Fig. 21. Such a magnet may be a straight bar magnet or shaped as a horse-shoe or given any other suitable form. In general, however, it is more convenient to apply an electro-magnet as shown in Fig. 22. As therein disclosed a magnet is automatically energized when it is pressed into operating relation with a plug and is deenergized when it is removed. This is accomplished by providing a core 25a that is hollow and has a plunger 67 sliding through it; the core is enclosed by a coil 24a. The plunger is in contact with a spring member 69 through an insulating end 68 whereby it is forced outwardly from the core. When the plunger is moved inwardly through engagement with the cover of a plug, a contact 70 carried by the piece 69 is pressed into engagement with another contact 71 thereby closing a circuit and energizing the magnet. Upon release of the plunger 67 the spring member 69 breaks the engagement of the contacts 70 and 71 and thereby deenergizes the magnet. This construction prevents over-heating of the magnet, since connection is established only when the magnet is in use; for this reason a smaller size of magnet is possible than would otherwise be practical. The cover-engaging end 66 of the core can be made square in cross section to fit a similarly shaped cavity 33a in the cover.

We claim:

1. A dummy plug for a threaded fuse socket comprising in combination a threaded base for engagement with the fuse socket, a cover swiveled on said base, cavities in said base and said cover with open ends in the adjacent faces thereof and positioned for bringing into register, a loose pellet of magnetic material in the cavity of the base and having a configuration permitting entry into the cavity of the cover, spring-pressed means in the cavity of the cover normally preventing entry of the pellet into the cavity of the cover when the cavities are in register, and means limiting the entry of the pellet to a partial removal from the cavity in the base when drawn by magnetic means into the cavity of the cover to thereby lock the members together, said spring-pressed means forcing the pellet from the cavity in the cover upon discontinuance of the operation of the magnetic means to unlock the base and cover and permit relative rotation.

2. A dummy plug according to claim 1 comprising as the spring-pressed means in the cavity of the cover a loose pellet and a spring between the pellet and the bottom of the cavity acting on the pellet to force it outwardly.

3. A dummy plug according to claim 1 comprising as the spring-pressed means in the cavity of the cover a loose pellet of a size too large to enter the cavity in the base and a spring between the pellet and the bottom of the cavity acting on the pellet to force it outwardly.

4. A dummy plug according to claim 1 wherein the cavities are cylindrical in shape with their axes parallel to and adjacent to the common axis of the swiveled members, and wherein the pellet is cylindrical.

5. A dummy plug for a threaded fuse socket comprising in combination a threaded base for engagement with the fuse socket, a cover swiveled on said base, cavities in said base and said cover with open ends in the adjacent faces thereof and positioned for bringing into register, a loose pellet of magnetic material in the cavity of the base and having a configuration permitting entry into the cavity of the cover, spring-pressed means in the cavity of the cover normally preventing entry of the pellet into the cavity of the cover when the cavities are in register, electromagnetic means associated with the plug and in cooperative relation to the pellet for drawing said pellet into the cavity of the cover when energized, and means limiting the entry of the pellet when drawn by the magnetic means into the cavity of the cover to a partial removal from the cavity of the base to thereby lock the base and the cover together, said spring-pressed means forcing the pellet from the cavity in the cover upon discontinuance of the operation of the magnetic means to unlock the base and the cover and permit relative rotation.

6. A dummy plug according to claim 5 having the electromagnetic means separable from the plug, and means on the cover for engagement by the electromagnetic means whereby the plug can be rotated by the electromagnetic means.

7. A dummy plug for a threaded fuse socket comprising in combination a threaded base for engagement with the fuse socket, a cover swiveled on said base, the body formed by the base and the cover having a cavity therein, a magnetic material plate within the cavity and movable therein from one position to another, means connected with said plate for simultaneously engaging the base and the cover in one position of the plate to lock the base and the cover against relative rotation, spring means within the cavity and engaging the plate for biasing the plate to a position out of simultaneous engagement with the base and the cover to thereby permit relative rotation, and electromagnetic means associated with the body and in cooperative relation to the plate for drawing the latter into the position for locking the base and the cover when energized.

8. A dummy plug for a threaded fuse socket comprising in combination a threaded base for engagement with the fuse socket, a cover swiveled on said base, the body formed by the base and the cover having a cavity therein, an armature within the cavity and movable from one position to another, an electromagnet mounted in the body in cooperative relation to the armature, means connected with said armature for simultaneously engaging the base and the cover in one position of the armature to lock the base and cover against relative rotation, and spring means within the cavity and engaging the armature for biasing the armature to a position out of simultaneous engagement with the base and the cover to thereby permit relative rotation, said electromagnet when energized serving to draw the armature into the position of locking the base and the cover.

9. A dummy plug for a threaded fuse socket comprising in combination a threaded base for engagement with the fuse socket, a cover swiveled on said base, the body formed by the base and the cover having a cavity therein, a ring of electrically conducting material in said cavity and movable from one position to another, means connected with said ring for simultaneously engaging the base and the cover in one position of the ring to lock the base and cover against relative rotation, spring means within the cavity and engaging the ring to bias the ring to a position out of simultaneous engagement with the base and the cover to thereby permit relative rotation, and an alternating current primary coil associated with said body and in cooperative relation to said ring to set up when energized a secondary current in said ring by induction to thereby cause repulsion of the ring into the locking position.

10. A dummy plug for a threaded fuse socket comprising in combination a threaded base for engagement with the socket, a cover swiveled on said base, the body formed by the base and cover having a cavity therein, a core of magnetic material fixed in said cover and extending within the cavity, a ring of electrically conducting material about said core and movable within the cavity from one position to another, means connected with said ring for simultaneously engaging the base and the cover in one position of the ring to lock the base and the cover against relative rotation, spring means within the cavity and engaging the ring for biasing the ring out of simultaneous engagement with the base and the cover to thereby permit relative rotation, and an alternating current primary coil associated with the body and in cooperative relation with the core to set up when energized a secondary current in said ring by induction to thereby cause repulsion of the ring into the locking position.

11. A dummy plug for a threaded fuse socket comprising in combination a threaded base for engagement with the socket, an exposed manipulative member of electrical insulating material swiveled on the base, magnetically responsive means movably supported within the body formed by the base and the member, and means for connecting said responsive means simultaneously with the base and the member to enable manipulation of the plug in the socket when the responsive means is energized by a magnet.

12. A dummy plug for a threaded fuse socket comprising in combination a threaded base for engagement with the socket, an exposed manipulative member of electrical insulating material swiveled on the base, magnetically responsive means movably supported within the body formed by the base and the member, means for connecting said responsive means simultaneously with the base and the member to enable manipulation of the plug in the socket when the responsive means is energized by a magnet, and biasing means within the body and in association with said responsive means for positioning the responsive means out of simultaneous connection with the base and the member.

13. A dummy plug for a threaded fuse socket comprising in combination a threaded base of electrical insulating material for engagement with the socket, an exposed manipulative member of electrical insulating material rotatably secured to the base, magnetically responsive means movably supported within the body formed by the base and the member, and means for connecting said responsive means simultaneously with the base and the member to enable manipulation of the plug in the socket when the responsive means is energized by a magnet.

14. A dummy plug for a threaded fuse socket comprising in combination a threaded base of electrical insulating material for engagement with the socket, an exposed manipulative member of electrical insulating material rotatably secured to the base, magnetically responsive means movably supported within the body formed by the base and the member, means for connecting said responsive means simultaneously with the base and the member to enable manipulation of the plug in the socket when the responsive means is energized by a magnet, and biasing means within the body and in association with said responsive means for positioning the responsive means out of simultaneous connection with the base and the member.

LAWRENCE J. MONTGOMERY.
CHARLES H. BOSCH.